United States Patent [19]

Martin

[11] Patent Number: 4,974,537
[45] Date of Patent: Dec. 4, 1990

[54] ROD AND REEL HOLDER FOR FISHING BOATS

[75] Inventor: Robert L. Martin, Springfield, Mo.

[73] Assignee: Tracker Marine Corporation, Springfield, Mo.

[21] Appl. No.: 351,468

[22] Filed: May 15, 1989

[51] Int. Cl.⁵ .............................................. B63B 35/14
[52] U.S. Cl. .................................. 114/255; 43/21.002; 114/364; 206/315.011; 224/311; 224/922
[58] Field of Search ....................... 114/255, 364, 343; 43/21.2, 54.1, 57.1; 211/70.8; 206/315.11; 224/922, 328, 311, 42.45 R

[56] References Cited

U.S. PATENT DOCUMENTS

| | | | |
|---|---|---|---|
| 3,406,930 | 10/1968 | Seiler | 224/922 |
| 3,824,733 | 7/1974 | Cordell | 43/54.1 |
| 4,170,801 | 10/1979 | Ward | 114/343 |
| 4,523,704 | 6/1985 | Washington | 224/328 |

Primary Examiner—Sherman Basinger
Assistant Examiner—Thomas J. Brahan
Attorney, Agent, or Firm—Kokjer, Kircher, Bradley, Wharton, Bowman & Johnson

[57] ABSTRACT

A rod and reel storage system for a fishing boat. In one embodiment, trays are mounted in the gunwale walls and provided with guide tubes through which stored fishing rods extend into the gunwale cavity. The trays have separate compartments which receive and hold the reels. Hinged hatches on the gunwales cover gunwale hatchways that provide access to stored rods and reels. In another embodiment, a reel storage compartment is located to one side of the control console of the boat, and tubes extend forwardly beneath the bow fishing deck to hold the rods. A hinged door opens and closes the storage compartment and may be locked closed.

15 Claims, 2 Drawing Sheets

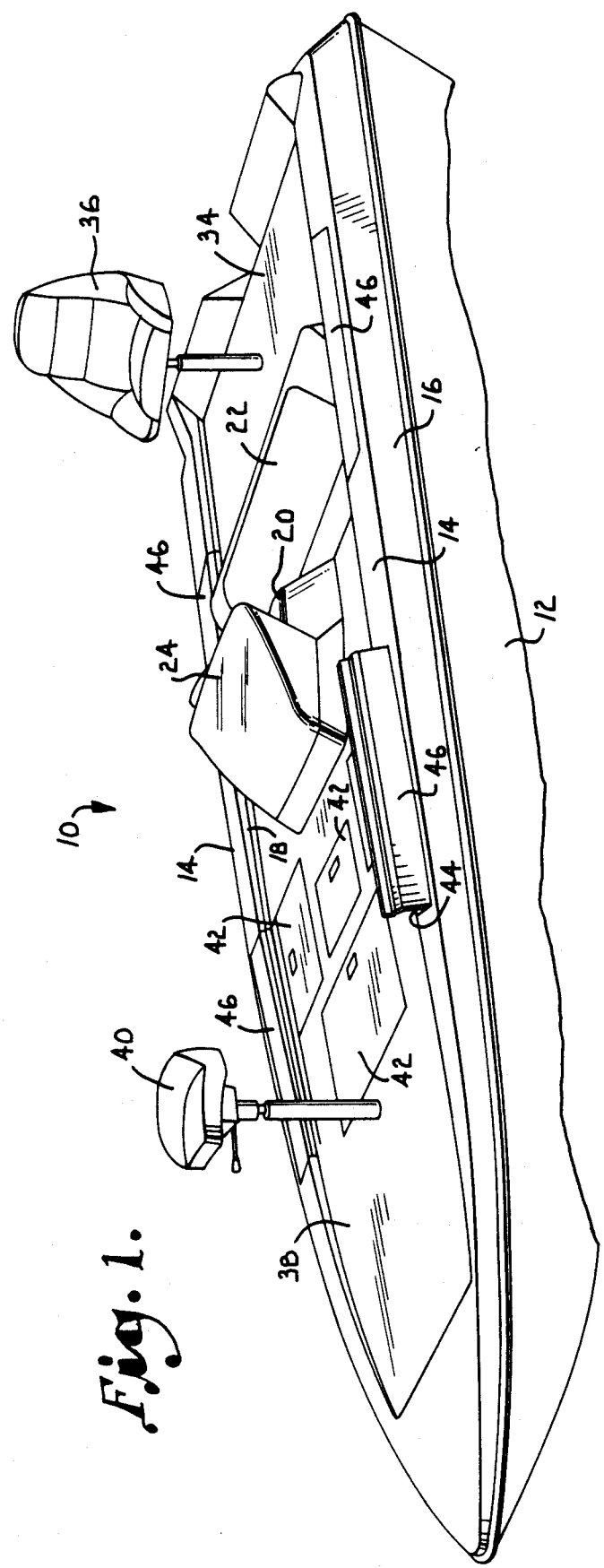
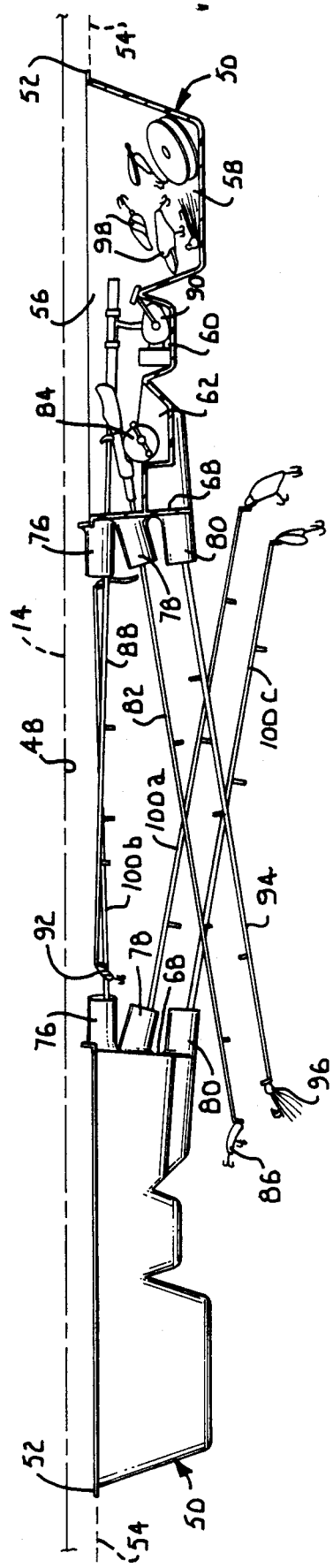

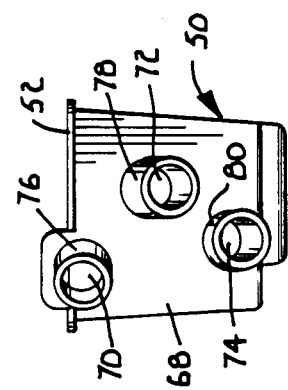
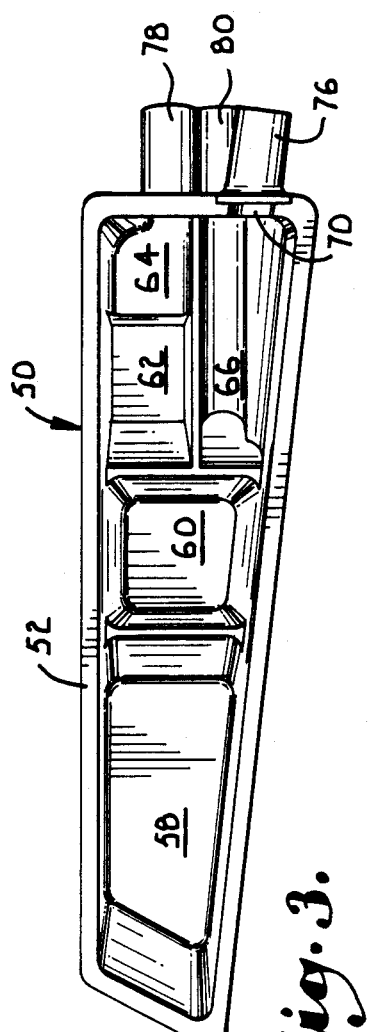
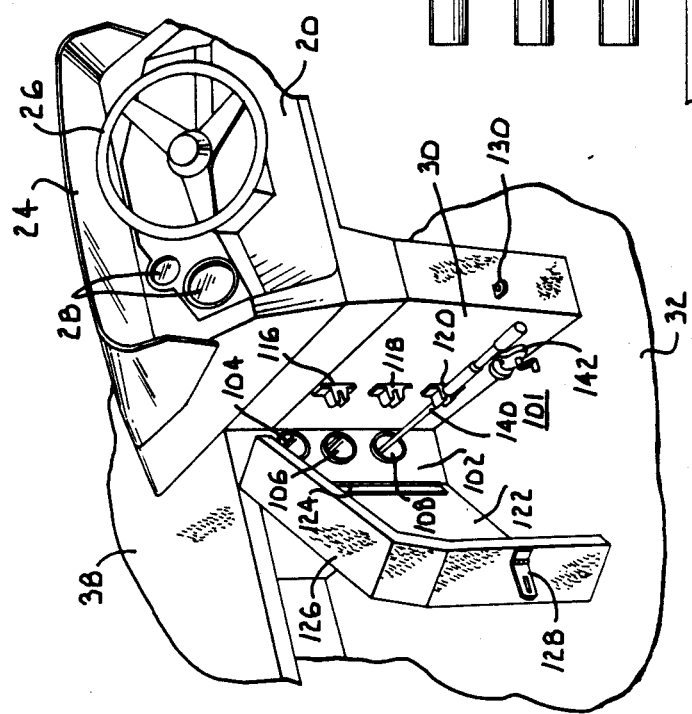
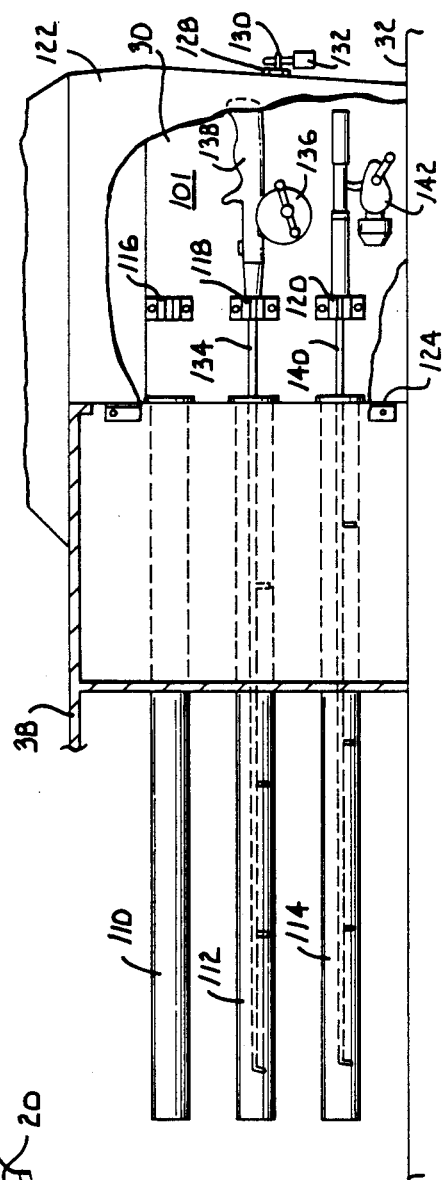

ROD AND REEL HOLDER FOR FISHING BOATS

BACKGROUND AND SUMMARY OF THE INVENTION

This invention relates generally to fishing boats and particularly to a rod and reel holder which permits fishing rods and reels to be stored on a fishing boat at locations that are out of the way and yet easily accessible.

Many fishermen, particularly those who participate in tournament fishing events, make use of several rods and reels which have different baits. For example, a rod with a casting reel may have a surface type lure and another rod with a spinner reel may be equipped with a different type bait. The fisherman may change from one rod to another from time to time as circumstances change. Thus, if a fisherman happens to see a fish break water, he may change from whatever rod he is using to a different rod that is baited with a top water lure. The rods that are not in use are already baited and ready to be used at any time.

Typically, the rods that are not being used are place haphazardly in the boat where they can create considerable clutter. They may be stepped on and possibly damaged or they may be inadvertently knocked out of the boat and lost. When the boat is moved from place to place, as happens frequently in many types of fishing such as bass fishing, the rods must either be tied down or placed in a separate rod box. Then, when the new location is reached, the rods are untied or removed from their storage boxes. In either event, considerable inconvenience is involved. Fishing rods that are laying haphazardly in the boat also present a safety hazard in that the fisherman may trip over them or become snagged on a hook.

The present invention provides a solution to the problem of clutter caused by numerous fishing rods and reels laying around in a fishing boat. In accordance with one form of the invention, a fishing boat is provided with a storage area which is located in the gunwale wall and which is constructed uniquely to accommodate different rod and reel combinations. An alternative form of the invention provides a storage area to one side of the control console of the boat and beneath the forward fishing deck. In both embodiments, space that is otherwise essentially wasted is made use of for storing the rods and reels. The fishing equipment is out of the way when it is stored and yet remains conveniently accessible so that any one of the rods and reels can be quickly located and used. Both storage systems provided for locking of the fishing equipment so that it is maintained under security both when the boat is stored overnight and when it is left unattended temporarily for any reason.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a fishing boat equipped with a rod and reel holding system constructed in accordance with one embodiment of the present invention, with one of the gunwale hatch covers in the open position and the remaining hatch covers in the closed position;

FIG. 2 is a fragmentary sectional view on an enlarged scale taken through one of the gunwales on a vertical plane and showing how the rods and reels fit in the gunwale storage arrangement;

FIG. 3 is a fragmentary top plan view of one of the gunwale storage trays;

FIG. 4 is an end elevational view of the storage trays shown in FIG. 3 taken from the right hand;

FIG. 5 is a fragmentary perspective view of a fishing boat which is equipped with a rod and reel storage system constructed according to another embodiment of the invention, with the door of the storage compartment in the open position;

FIG. 6 is a fragmentary sectional view on an enlarged scale taken on a vertical plane and showing a pair of rods and reels placed in the storage system shown in FIG. 5, with the door of the storage compartment closed.

DETAILED DESCRIPTION OF THE INVENTION

Referring now to the drawings in more detail, the present invention is directed to a fishing rod holder for a fishing boat such as the boat generally identified by reference numeral 10 in FIG. 1. The boat 10 has a hull 12 and gunwales 14 on its opposite sides. Each gunwale 14 is bounded at the outside by an outer wall 16 and at the inside by an inner wall 18. A control and steering console 20 is located near the center of the boat immediately in front of a driver seat 22. The console 20 is equipped with a windshield 24. As shown in FIG. 5, the console 20 is equipped with a steering wheel 26 and various gauges 28. The console 20 is mounted on opposite sidewalls 30 extending to the floor 32 of the boat below the driver seat 22.

A stern fishing deck 34 is provided near the stern and has a stern fishing seat 36. A larger fishing deck 38 is provided in the bow area of the boat and has a bow fishing seat 40. The deck 38 may be provided with various storage compartments which are normally covered by hatches such as those identified by numeral 42.

In accordance with one embodiment of the present invention and as best shown in FIG. 1, each of the gunwales 14 is provided with a pair of hatchways 44, and each hatchway is normally closed by a hinged hatch cover 46. When the hatch covers 46 are open (the position shown for the front hatchway on the port side in FIG. 1), access is provided through the corresponding hatchways 44 to a cavity 48 (see FIG. 2) which is formed beneath the gunwale 14 and between the walls 16 and 18. Each hatch cover 46 can be opened and closed about a generally horizontal hinge axis. When closed, the hatch covers 46 form portions of the gunwale 14.

Four trays 50 are mounted in the gunwale cavity 48 at locations immediately underlying the respective hatchways 44. The upper edge of each tray 50 is provided with a peripheral lip 52 which rests on a supporting surface 54 within the cavity 48 in order to mount the tray 50.

Each tray 50 is open at the top and provides within its interior a storage compartment 56 which is in turn divided into a plurality of separate compartments such as those identified by numerals 58, 60, 62, 64 and 66 in FIG. 3. The compartments 58–66 are different from one another in size and shape and serve to hold fishing reels and various other fishing accessories, as will be explained more fully.

Each tray 50 has one end wall 68 which is provided with three spaced apart openings 70, 72 and 74 (see FIG. 4). The openings 70–74 are arranged irregularly on the end wall 68, with opening 70 being located near the top of the tray, opening 74 being located near the bottom of the tray, and opening 72 being located between but to one side of the other openings 70 and 74.

Extending from the end wall 68 are three guide tubes 76, 78 and 80 which are in registration with the openings 70, 72 and 74 respectively. The guide tubes extend outwardly away from the tray and may be any desired length. The guide tubes 76–80 are out of parallel and generally diverge as they extend away from the wall 68. Thus, the upper guide tubes 76 angles generally to the left as viewed in FIG. 4, tube 78 angles generally downwardly and tube 80 angles downwardly although at a somewhat less drastic angle than tube 78.

The two trays 50 which are located beneath each gunwale 14 are oriented such that their end walls 68 face one another, with the tubes 76–80 extending generally toward one another in the manner best shown in FIG. 2.

In use, the gunwale storage devices serve to hold fishing rods and reels which are baited and ready for use. For example, as shown in FIG. 2, a fishing rod 82 provided with a casting reel 84 may have its line baited with an artificial lure 86 suitable for casting and reeled in against the eyelet on the tip of the rod 82. The rod 82 may be extended through opening 72 and tube 78 with the reel 84 fitting in compartment 62. Another rod 88 may be provided with a spinning reel 90, and its line may be baited with a suitable lure 92. Rod 82 is stored with the rod extending through tube 76 and with the reel 90 received in cavity 60. A third rod 94 having a lure 96 is extended through tube 74 with its reel (not shown) being received and held in compartment 66 or another vacant compartment. Compartment 58 is a relatively large compartment that can receive extra lures 98 or other fishing accessories. Compartment 58 can also receive the butt end of a rod having an especially long handle.

The other tray 50 on the same side of the boat likewise stores three reels (not shown) which are mounted on rods 100a, 100b and 100c that extend through tubes 78, 76 and 80, respectively, of the tray. It is noted that the diverging arrangement of the guide tubes keeps the rods that extend from any one tray from becoming entangled with one another. Similarly, the diverging arrangement of the tubes prevents the rods that project from the opposing trays from becoming entangled.

It should be noted that the guide tubes 76–80 can be equipped with extensions (not shown) that would completely enclose the rods which are extended into the tubes. In this type of arrangement, the fishing rods would be completely contained within tubes and there would be no problem with possible entanglement or other interference between the rods. At the same time, the open part of the gunwale cavity 48 could be filled with foam or another material if desired.

Rods and reels that are not being used for fishing can be stored in the gunwale cavities in this manner. To remove one of the rods from storage, the fisherman needs only to raise the corresponding hatch cover 46 to the open position and grab the handle of the desired rod to pull the rod and reel out of the storage area. The rod that was previously being used by the fisherman can be placed in the storage area in place of the rod that has been removed. It is noted that the lures on the stored rods are ready for use, so that the rod and reel can be used immediately after it has been withdrawn from the storage compartment.

In this manner, the rods and reels that are not being used can be conveniently stored in the gunwale storage compartments along with spare lures 98 and other fishing accessories. Because of the easy accessibility of the contents of the storage compartments, rods and reels can be quickly and easily reached and removed from storage for immediate use. At the same time, the rods and reels are out of the way and do not clutter the boat when they are stored.

It is contemplated that each hatch cover 46 will be provided with a suitable lock (not shown) so that the hatch cover can be locked in the closed position for security of the contents of the storage compartments. It is noted that there are two storage compartments adjacent to the bow fishing deck 38, one on each side of the boat, and that there are likewise two storage compartments adjacent to the stern fishing deck 34, one on each side of the boat. Consequently, a large number of spare rods and reels can be stored in the compartments at locations accessible from both the bow fishing deck 38 and the stern fishing deck 34.

FIGS. 5 and 6 illustrate an alternative embodiment of the present invention. In accordance with this embodiment of the invention, a storage compartment 101 is provided adjacent to one of the sides 30 of the console. The front of the storage compartment 101 is formed by a partition 102 which presents three spaced apart openings 104, 106 and 108 located one above the other. Extending forwardly from the partition 102 in registration with openings 104, 106 and 108 are three tubes 110, 112 and 114, respectively. The tubes 110–114 extend beneath the bow fishing deck 38 and are parallel to one another.

Within the storage compartment 101, the side 30 is provided with three clips 116, 118 and 120 which function to receive fishing rods at locations near the reels which are mounted on the rods. The clips are spaced one above the other and are generally aligned with the openings 104, 106 and 108.

The storage compartment 101 may be closed by a hinged door 122 which is connected to one edge of partition 102 by a piano type hinge 124. The hinge provides a vertical axis about which the door 122 can be swung between the open position shown in FIG. 5 and a closed position in which it encloses the contents of the storage compartment 100. The door 122 has a flange 126 on its top and back edges, and the flange encloses compartment 101 at the top and back when the door is closed. The door 120 has a hasp 128 which cooperates with an apertured ear 130 to provide a means for locking the door 122 closed, as with a conventional padlock of the type identified by numeral 132 in FIG. 6.

In use of the storage arrangement shown in FIGS. 5 and 6, each of the tubes 110–114 may receive a rod which is being stored. For example, FIG. 6 shows a rod 134 which is received in tube 112 and which is equipped with a casting reel 136. The rod 134 is received and held by the clip 118 near the handle 138 of the rod. Another rod 140 equipped with a spinning reel is extended into the lower tube 114, with the rod 140 received and held by the lower clip 120. A third rod may be inserted into the upper tube 110 with the rod received in the upper clip 116 to locate the reel which is mounted on a rod within the storage compartment 101.

Each rod which is stored in the compartment 101 may be quickly and easily withdrawn by removing the rod from the clip which holds it and then withdrawing the rod from the tube which holds it. It is contemplated that the rod will already be baited and ready for use.

The rods and reels that are stored in the storage compartment 101 are thus conveniently accessible when the door 122 is in its open position. The storage compartment 101 is also at a generally central location in the boat to maximize access to it. At the same time, the rods are stored for the most part beneath the bow fishing deck 38 in what is otherwise normally wasted space.

It is noteworthy that the contents of the storage compartment 101 may be completely enclosed by closing the door 122. Additionally, the contents of the storage compartment can be made secure by locking the door closed, as by means of the padlock 132 or some other type of locking mechanism.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a fishing boat having a gunwale and an enclosed cavity beneath the gunwale bounded by inner and outer walls, the improvement comprising:
   a hatchway in said gunwale providing access therethrough to said cavity;
   a reel storage chamber presented in said cavity at a location underlying said hatchway, said storage chamber being accessible through said hatchway and having means for receiving and holding a plurality of fishing reels; and
   a plurality of openings adjacent said storage chamber each having a size to receive a fishing rod in extension therethrough, said openings being located and arranged to permit fishing rods to extend therethrough while reels mounted on the rods are received and held by said receiving and holding means.

2. The improvement of claim 1, including a hatch cover for said hatchway, said hatch cover having a closed position closing the hatchway and an open position exposing the hatchway.

3. The improvement of claim 1, including a guide tube extending from each of said openings for receiving the fishing rod extended through the corresponding opening.

4. The improvement of claim 1, including a tray in said cavity, said tray forming said reel storage chamber and presenting a plurality of compartments which provide said receiving and holding means for the fishing reels.

5. The improvement of claim 4, including a plurality of tubes extending from said tray and registering with the respective openings to receive the fishing rods extended through the openings.

6. The improvement of claim 5, wherein at least some of said guide tubes are out of parallel.

7. The improvement of claim 6, wherein at least some of said guide tubes diverge away from said tray.

8. The improvement of claim 4, wherein said compartments have different sizes.

9. The improvement of claim 4, including a hatch cover for opening and closing said hatchway, said tray having an open top providing access to said compartments from the top through said hatchway when the hatch is open.

10. The improvement of claim 1, including:
    a second hatchway in said gunwale providing access therethrough to said cavity, said second hatchway being spaced from the first mentioned hatchway;
    a second reel storage chamber presented in said cavity at a location underlying said second hatchway, said second reel storage chamber being accessible through said second hatchway and having means for receiving and holding a plurality of fishing reels;
    a plurality of openings adjacent said second storage chamber each having a size to receive a fishing rod in extension therethrough, said openings for the second storage chamber being located and arranged to permit fishing rods to extend therethrough while reels mounted on the rods are received and held by said receiving and holding means; and
    said openings for the first mentioned storage chamber and the second storage chamber being located and arranged such that rods extending through the openings for the first chamber extend toward the second chamber and rods extending through the openings for the second chamber extend through the first chamber.

11. A fishing rod and reel holder for a fishing boat having a gunwale and a cavity underlying the gunwale bounded by inner and outer walls of the boat hall, said holder comprising:
    a tray mounted in said cavity between said walls and presenting a plurality of compartments accessible from the top, each compartment having a size to receive and hold a reel; and
    a plurality of openings in said tray each having a size to receive a fishing rod in extension therethrough into the cavity, said openings being located and arranged to permit reels mounted on the rods to be received and stored in said compartments while the rods extend out of the tray through said openings for storage of the rods and reels beneath the gunwale between said inner and outer walls.

12. The holder of claim 11, including a plurality of guide tubes extending from said tray and registering with the respective openings to receive the fishing rods extended through the openings.

13. The holder of claim 12, wherein at least some of said guide tubes are out of parallel.

14. The holder of claim 13, wherein at least some of said guide tubes diverge away from said tray.

15. The holder of claim 11, wherein said compartments have different sizes.

* * * * *